US011593664B2

(12) United States Patent
Folliot et al.

(10) Patent No.: US 11,593,664 B2
(45) Date of Patent: Feb. 28, 2023

(54) METHOD AND COMPUTATIONAL TOOL FOR DETERMINING TRANSFER FUNCTIONS BETWEEN PAIRS OF SUCCESSIVE LAYERS OF A NEURAL NETWORK

(71) Applicants: STMicroelectronics S.r.l., Agrate Brianza (IT); STMicroelectronics (Rousset) SAS, Rousset (FR)

(72) Inventors: Laurent Folliot, Gourdon (FR); Pierre Demaj, Nice (FR); Emanuele Plebani, Sotto il Monte Giovanni XXIII (IT)

(73) Assignees: STMicroelectronics (Rousset) SAS, Rousset (FR); STMicroelectronics S.r.l., Agrate Brianza (IT)

( * ) Notice: Subject to any disclaimer, the term of this patent is extended or adjusted under 35 U.S.C. 154(b) by 364 days.

(21) Appl. No.: 16/917,414

(22) Filed: Jun. 30, 2020

(65) Prior Publication Data
US 2021/0012208 A1  Jan. 14, 2021

(30) Foreign Application Priority Data

Jul. 10, 2019 (EP) ..................... 19290051

(51) Int. Cl.
 *G06N 3/10* (2006.01)
 *G06N 3/04* (2023.01)
 *G06N 3/08* (2023.01)

(52) U.S. Cl.
 CPC .............. *G06N 3/10* (2013.01); *G06N 3/04* (2013.01); *G06N 3/08* (2013.01)

(58) Field of Classification Search
 CPC .. G06N 3/10; G06N 3/04; G06N 3/08; G06N 3/0454; G06N 3/084; G06N 3/063; G06N 3/0481; G06K 9/6256; G06K 9/6267
 See application file for complete search history.

(56) References Cited

U.S. PATENT DOCUMENTS

| 5,280,564 | A  | * | 1/1994  | Shiomi | G06N 3/0481 |
|-----------|----|---|---------|--------|-------------|
|           |    |   |         |        | 706/31      |
| 7,639,399 | B2 | * | 12/2009 | Ikeda  | H04N 1/60   |
|           |    |   |         |        | 358/1.9     |
| 2018/0315399 | A1 | * | 11/2018 | Kaul | G06F 7/483 |
| 2018/0350109 | A1 | * | 12/2018 | Pan  | G06K 9/6262 |

(Continued)

OTHER PUBLICATIONS

Yi, Yan, et al., "A New Learning Algorithm for Neural Networks with Integer Weights and Quantized Non-linear Activation Functions", 2008, in IFIP International Federation for Information Processing, vol. 276, Artificial Intelligence and Practice II, pp. 427-431.

(Continued)

*Primary Examiner* — Farley Abad
(74) *Attorney, Agent, or Firm* — Slater Matsil, LLP

(57) ABSTRACT

A method can be performed prior to implementation of a neural network by a processing unit. The neural network comprising a succession of layers and at least one operator applied between at least one pair of successive layers. A computational tool generates an executable code intended to be executed by the processing unit in order to implement the neural network. The computational tool generates at least one transfer function between the at least one pair of layers taking the form of a set of pre-computed values.

24 Claims, 2 Drawing Sheets

(56) References Cited

U.S. PATENT DOCUMENTS

| | | | |
|---|---|---|---|
| 2019/0244080 A1* | 8/2019 | Li | G06N 3/0454 |
| 2019/0325567 A1* | 10/2019 | Jones | G06K 9/6267 |
| 2020/0234126 A1* | 7/2020 | Covell | G06N 3/0481 |

OTHER PUBLICATIONS

Piazza, F., et al., "Neural Networks with Digital LUT Activation Functions", Proceedings of 1993 International Joint Conference on Neural Networks, Nagoya, Japan, Oct. 25-29, 1993, pp. 1401-1404.

Rishnamoorthi, Raghuraman, "Quantizing deep convolutional networks for efficient inference: A whitepaper", Jun. 2018, 36 pages.

Jacob, Benoit, et al., "Quantization and Training of Neural Networks for Efficient Integer-Arithmetic-Only Inference", The IEEE Conference on Computer Vision and Pattern Recognition (CVPR), 2018, 14 pages.

Baluja, Shumeet, et al., "No Multiplication? No Floating Point? No Problem! Training Networks for Efficient Inference", Sep. 2018, 13 pages.

https://github.com/onnx/onnx/blob/master/docs/Operators.md, May 25, 2020, 229 pages.

\* cited by examiner

METHOD AND COMPUTATIONAL TOOL FOR DETERMINING TRANSFER FUNCTIONS BETWEEN PAIRS OF SUCCESSIVE LAYERS OF A NEURAL NETWORK

CROSS-REFERENCE TO RELATED APPLICATIONS

This application claims priority to European Patent Application No. 19290051.2, filed on Jul. 10, 2019, which application is hereby incorporated herein by reference.

TECHNICAL FIELD

Modes of implementation and embodiments of the invention relate to method for implementing a neural network.

BACKGROUND

Neural networks are widely used to solve various statistical problems, especially the problem of classification of data.

After a machine learning phase, which is generally supervised, i.e., carried out using an already classified reference database, a neural network "learns" and becomes capable of applying the same classification to unknown data by itself.

Mention may be made of convolutional neural networks (CNN), which are a type of neural network in which the pattern of connection between two layers is inspired by the visual cortex of animals. Such neural networks allow effective recognition of objects or people in images or videos.

The architecture of a neural network generally comprises a succession of layers each of which receives its inputs from the outputs of the preceding layer.

Deep neural networks are tending to become increasingly complex and more and more users are seeking to quantize the input and output data of each layer thereof in order to improve processing speed and to decrease the memory space required to store these data.

For example, the output data and input data of each layer may be quantized to eight or sixteen bits but with identical or different quantization formats.

Specifically, all the layers may not be quantized with the same precision and have the same range of values, these parameters in particular depending on the dynamic range of the output data of the layers.

In a neural network, the input data are multiplied by at least one weight of a given value for each layer.

By "weights", which is a term the meaning of which in the field of neural networks is well known to those skilled in the art, what is meant is neuron parameters that are configurable to obtain good output data.

These weights are initially defined in the neural network using a training database. More precisely, the neural network for example processes an image extracted from the database and makes as output a prediction, i.e., determines to which class the image could belong even though the class of the image is already known.

Depending on the veracity of this result, all the weights of the neural network are updated for example using a back-propagation algorithm.

Once again, the weights of each layer may, especially for reasons of memory optimization, be represented with sixteen or eight bits.

Examples of quantization schemes are well known to those skilled in the art.

Information on these quantization schemes may especially be found in the article by Benoit Jacob et al. entitled "Quantization and Training of Neural Networks for Efficient Integer-Arithmetic-Only Inference" arXiv:1712.05877v1 [cs.LG] 15 Dec. 2017, Google Inc. (https://arxiv.org/pdf/1712.05877.pdf), and in the article by Raghuraman Krishnamoorthi entitled "Quantizing deep convolutional networks for efficient inference: A whitepaper", arXiv:1806.08342v1 [cs.LG] 21 Jun. 2018, Google (https://arxiv.org/pdf/1806.08342.pdf).

Moreover, most often, provision is made for one or more operators, which are applied to the output of a layer. Such an operator may be of any type and is most often non-linear. It may also be an operator of ONNX type.

It will be recalled that ONNX (Open Neural Network Exchange) is an AI-related community project that provides in particular a definition of an extensible computation graph model, as well as definitions of built-in operators and standard data types.

This type of ONNX operator is well known to those skilled in the art, who may for example refer to the document available at the following Internet link:

https://github.com/onnx/onnx/blob/master/docs/Operators.md

Conventional approaches to determining a transfer function between two layers that applies one or more operators are ineffective.

Specifically, they firstly require each quantized datum of the output layer of the first layer to be converted into data expressed in floating-point format, then the operator to be approximated in floating-point format, using series for example, and this approximation to be applied to each output datum of the first layer and, finally, the result to be re-quantized in the appropriate quantization format in order to deliver the quantized input data of the following layer.

This is done in real-time by the processor that executes the neural network, and is completely inefficient in terms of computation time and memory.

SUMMARY

Modes of implementation and embodiments of the invention relate to neural networks, particularly but not exclusively deep neural networks, and especially to the determination of transfer functions, between pairs of successive layers of the neural network, that apply one or more operators.

Embodiments provide a satisfactory solution to problems of the prior art.

In one embodiment, a method can be performed prior to implementation of a neural network by a processing unit. The neural network comprising a succession of layers and at least one operator applied between at least one pair of successive layers. A computational tool generates an executable code intended to be executed by the processing unit in order to implement the neural network. The computational tool generates at least one transfer function between the at least one pair of layers taking the form of a set of pre-computed values.

Additional embodiments and variations are discussed below.

BRIEF DESCRIPTION OF THE DRAWINGS

Other advantages and features of the invention will become apparent on reading the detailed description of completely non-limiting modes of implementation and embodiments, and the appended drawings, in which.

DETAILED DESCRIPTION OF ILLUSTRATIVE EMBODIMENTS

Figure 1:
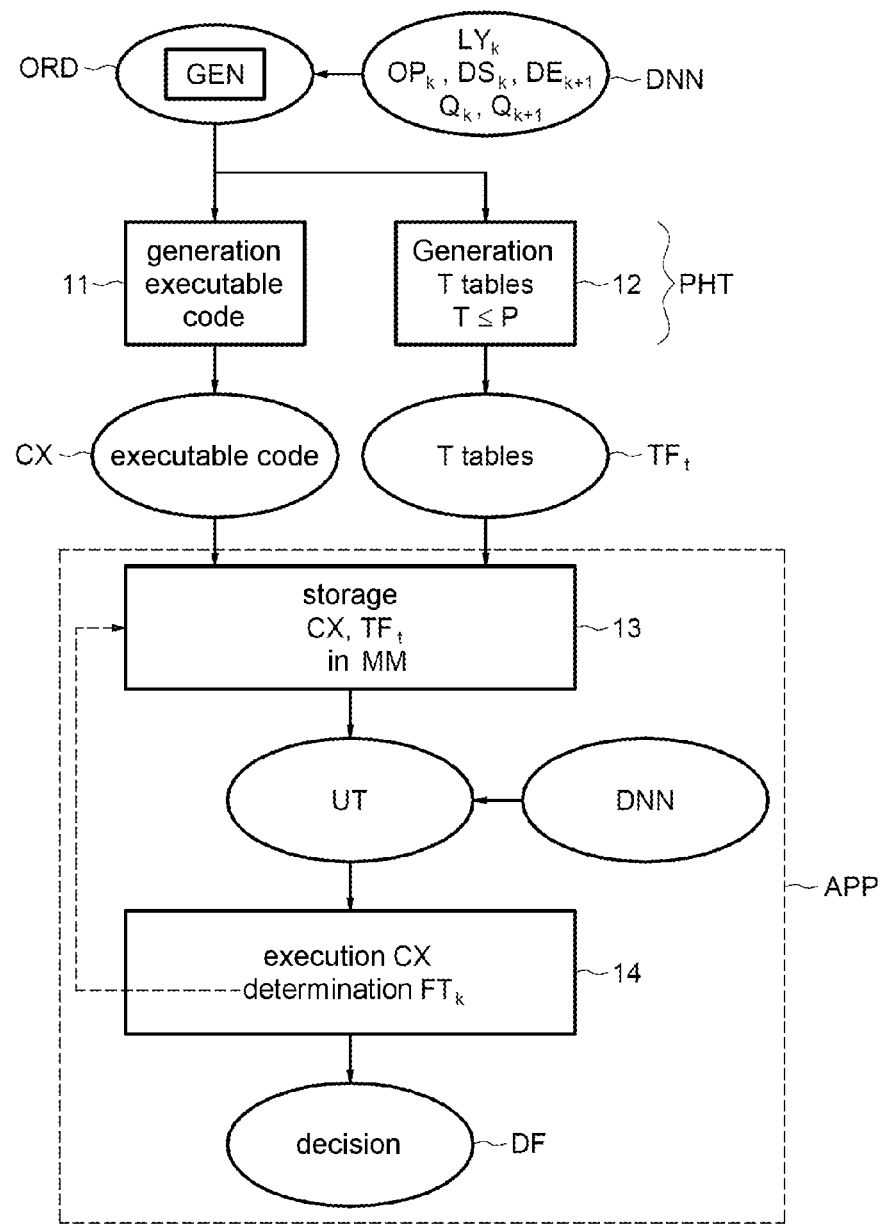
FIGS. 1 to 3 relate to modes of implementation and embodiments of the invention.

According to one mode of implementation and embodiment, a method and computational tool that are capable of determining such transfer functions in a way that is efficient in terms of memory and of computation time and that decrease the performance of the neural network in question by a minimal amount, are provided.

According to one mode of implementation and embodiment, it is proposed not to compute the one or more transfer functions in real-time during the implementation of the neural network but to pre-compute the values of this or these transfer functions to for example form one or more tables, i.e., it is proposed to compute these values, advantageously during or after the training phase of the neural network, before its implementation by a processing unit, which may for example be a microprocessor of a device—a smart cell phone or even a tablet computer for example. These examples are non-limiting.

According to one aspect, a method is performed prior to an implementation of a neural network by a processing unit, for example a microprocessor of a device such as a cell phone. The neural network comprises a succession of layers and at least one operator applied between at least one pair of successive layers. The method comprises generating, with a computational tool, a personal laptop computer for example, an executable code intended to be executed by the processing unit in order to implement the neural network, and generating, with the computational tool, at least one transfer function between the at least one pair of layers taking the form of a set of pre-computed values.

These values are pre-computed in the sense that they are computed before the implementation of the neural network by the processing unit. Thus, during the implementation of the neural network, i.e., during the execution by the processing unit of the executable code, the one or more transfer functions will no longer need to be computed in real-time. It will be enough quite simply to extract the corresponding values from the pre-computed values.

In general, the output data of the first layer of the pair of layers are advantageously quantized using a first quantization scheme and the input data of the second layer of the pair are advantageously quantized using a second quantization scheme.

The two quantization schemes may be identical or different.

Likewise, the number of bits of the quantized input data and the number of bits of the quantized output data may be identical or different.

The transfer function takes into account the first and second quantization schemes, and the at least one operator.

Generally, the operator may be any function (or "activation" to use a term well known to those skilled in the art of neural networks).

The operator may thus, for example, be the "identity" operator (OP(x)=x). In this case, the transfer function behaves simply like a convergent function allowing data quantized using a first quantization scheme to be converted into data quantized using a second quantization scheme.

According to one mode of implementation, the at least one transfer function is intended, during the implementation of the neural networks, to receive, from the first layer of the pair, quantized output data, to apply the at least one operator and to deliver, to the second layer of the pair, quantized input data.

The generation of the at least one transfer function comprises, for each possible quantized value of the output data, applying an inverse first quantization function allowing the quantized value to be converted into a floating-point value, applying the at least one operator to the floating-point value so as to obtain an intermediate floating-point value, and applying a second quantization function to the intermediate value so as to deliver the corresponding quantized value of the input datum. The generation also comprises generating a lookup table forming the set of values and containing, for all the possible values of the quantized output data, all the corresponding possible values of the quantized input data.

It is possible to use any type of operator, for example operators with a plurality of inputs and a plurality of outputs.

However, it is preferable, in this case, to limit the number of bits to which the input and output data are quantized so as to limit the size of the lookup table and therefore the memory space required to subsequently store it in the device intended to implement the neural network.

For this reason, it is preferable to use, for the at least one operator, a point-to-point operator, i.e., an operator having one input and one output. Thus, the input and output data may be quantized to any number of bits, for example eight or sixteen bits.

According to one mode of implementation, in which the neural network comprises at least one operator applied between P pairs of successive layers, the generation of the P respective transfer functions between the P pairs of layers comprises generating at most P sets of values.

Specifically, it is possible, during the pre-computation of the sets of values, which sets are representative of the P transfer functions, for a given set of values to be able to be used for two transfer functions between two different pairs of layers.

Generally, provision is made for a phase of training the neural network and the generation of the at least one transfer function is advantageously carried out during or after the training phase, this allowing the values of all of the pre-computed values to be adjusted especially depending on the values of the weights of the neural network, which values will have been optimized during the training phase.

According to another aspect, a computational tool configured to implement the method as defined above is provided.

According to another aspect, a method for implementing a neural network using a processing unit is provided, the neural network comprising a succession of layers and at least one operator applied between at least one pair of successive layers.

This method of implementation comprises storing, in a memory, an executable code allowing the neural network to be implemented and a set of values representative of at least one transfer function between the at least one pair of layers, and executing the executable code with the processing unit. This execution comprises, to determine the transfer function, extracting, from the set of stored values, values corresponding to the values of the quantized output data of the first layer of the at least one pair of layers, the extracted values being the quantized input data of the second layer of the pair.

According to one mode of implementation, the set of values is stored in the form of a lookup table representative of the at least one transfer function between the at least one pair of layers, this transfer function being intended, during the implementation of the neural network, to receive, from the first layer of the pair, quantized output data, to apply the at least one operator and to deliver, to the second layer of the pair, quantized input data, the at least one lookup table containing, for all the possible values of the quantized output data, all the corresponding possible values of the quantized input data.

The at least one operator is for example a point-to-point operator.

When the neural network comprises at least one operator applied between P pairs of successive layers, at most P sets of values representative of the P transfer functions between the P pairs of layers are stored for example in the memory.

According to another aspect, a device configured to implement the method of implementation defined above is provided.

According to another aspect, a computational tool is provided, this tool comprising generating means configured, prior to an implementation of a neural network by a processing unit, the neural network comprising a succession of layers and at least one operator applied between at least one pair of successive layers, to generate an executable code intended to be executed by the processing unit in order to implement the neural network, and to generate at least one transfer function between the at least one pair of layers taking the form of a set of pre-computed values.

According to one embodiment, the at least one transfer function being intended, during the implementation of the neural network, to receive, from the first layer of the pair, quantized output data, to apply the at least one operator and to deliver, to the second layer of the pair, quantized input data. The generating means are configured, for the purposes of generating the at least one transfer function, for each possible quantized value of the output data, to apply an inverse first quantization function allowing the quantized value to be converted into a floating-point value, to apply the at least one operator to the floating-point value so as to obtain an intermediate floating-point value, and to apply a second quantization function to the intermediate value so as to deliver the corresponding quantized value of the input datum, and to generate a lookup table containing, for all the possible values of the quantized output data, all the corresponding possible values of the quantized input data.

According to one embodiment, the at least one operator is a point-to-point operator.

According to one embodiment, a computational tool is provided in which the neural network comprises at least one operator applied between P pairs of successive layers, and the generating means are configured to generate at most P lookup tables when generating the P respective transfer functions between the P pairs of layers.

According to one embodiment, the computational tool is configured to carry out a phase of training the neural network, and the generating means are configured to generate the at least one transfer function during or after the training phase.

According to one embodiment, the computational tool may comprise a microprocessor or a microcontroller incorporating the generating means.

According to another aspect, a device is provided. This device comprises a processing unit configured to implement a digital neural network. The neural network comprises a succession of layers and at least one operator applied between at least one pair of successive layers. A memory is configured to store an executable code allowing the neural network to be implemented and at least one set of values representative of at least one transfer function between the at least one pair of layers. The processing unit is configured to execute the executable code, this execution comprising, to determine the at least one transfer function, extracting, from the at least one set of stored values, values corresponding to the values of the quantized output data of the first layer of the at least one pair of layers, the extracted values being the quantized input data of the second layer of the pair.

According to one embodiment, the at least one set of values is stored in the form of at least one lookup table representative of the at least one transfer function between the at least one pair of layers, which transfer function is intended, during the implementation of the neural network, to receive, from the first layer of the pair, quantized output data, to apply the at least one operator and to deliver, to the second layer of the pair, quantized input data, the at least one lookup table containing, for all the possible values of the quantized output data, all the corresponding possible values of the quantized input data.

According to one embodiment, the at least one operator is a point-to-point operator.

According to one embodiment, in which the neural network comprises at least one operator applied between P pairs of successive layers, the memory is configured to store at most P sets of values representative of the P transfer functions between the P pairs of layers.

According to one embodiment, the processing unit may comprise a microprocessor or indeed a hardware accelerator.

Reference will now be made to the figures.

In FIG. 1, the reference ORD designates a computational tool, for example a personal laptop computer, comprising a microprocessor or a microcontroller.

The microprocessor of the tool ORD incorporates software generating means GEN that will especially generate (step 11) an executable code representative of a neural network DNN, in particular a deep neural network.

As illustrated in FIG. 1 schematically, this neural network DNN comprises a succession of layers a current layer of which is referenced LYk.

The reference DSk designates the quantized output data of the layer LYk.

The reference DEk+1 designates the quantized input data of the following layer LYk+1 of rank k+1.

The reference OPk designates an operator here applied between the layer LYk and the following layer LYk+1.

The reference Qk designates the quantization scheme of the output data DSk and the reference Qk+1 designates the quantization scheme of the input data DEk+1.

The quantization schemes Qk and Qk+1 may be identical or different especially depending on the precision desired for the corresponding data.

In the presence of an operator between two successive layers of the neural network, it is necessary to determine the transfer function that will receive, from the first layer of the pair of successive layers, here the layer LYk, the quantized output data, that will apply the operator OPk and that will deliver, to the second layer of the pair of layers, here the layer LYk+1, the quantized input data.

According to the invention, this transfer function will be generated in the form of a table TF of pre-computed values.

This generation 12 is also carried out by the generating means and it is advantageously carried out during or after the phase PHT of training the neural network so as to take into account the finalized values of the weights of the neural network.

In general, there is one lookup table TF per transfer function between two layers.

This being so, it is possible, when for example P operators are applied between P pairs of layers of the neural network, for a plurality of the pre-computed lookup tables to be identical for certain of the pairs of layers.

In other words, as illustrated in FIG. 1, the generating means, assuming that one or more operators are applied between P pairs of layers of the neural network, will generate T lookup tables with T lower than or equal to P.

The computational tool ORD will therefore deliver, on the one hand, an executable code CX and, on the other hand, T lookup tables TFt with t varying from 1 to T.

To implement the neural network within a device APP, for example, by way of non-limiting example, a smart cell phone or indeed a tablet computer, equipped with a processing unit UT, for example a microprocessor or indeed a hardware accelerator, the executable code CX and the various lookup tables TFt are stored (step 13) in a memory MM.

The memory may comprise one or more physical memories. In the latter case, the executable code CX may be stored in a first memory whereas the lookup tables TFt may be stored in another memory.

The processing unit UT then implements the neural network DNN that is delivered thereto with input data of any sort, by executing on the one hand the executable code CX and by determining on the other hand the various transfer functions FTk (step 14).

As schematically illustrated by the dashed arrow in FIG. 1, these various transfer functions FTk are not determined by real-time computations but by extracting pre-computed values, from corresponding lookup tables TFt, depending on the values of the output data of the first layer of the corresponding pair of layers.

This will be explained in more detail below.

The implementation of the neural network DNN allows, in the end, a decision DF, for example a classification decision, to for example be obtained.

Figure 2:
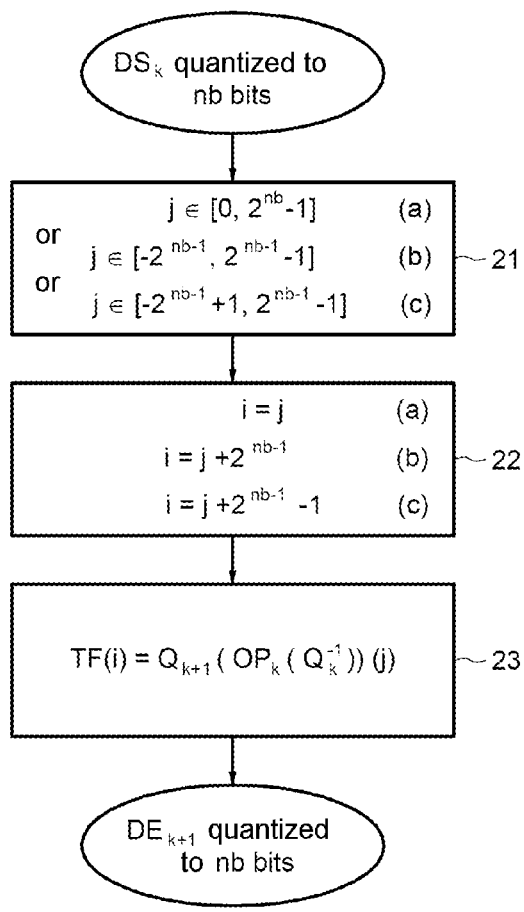
Figure 3:
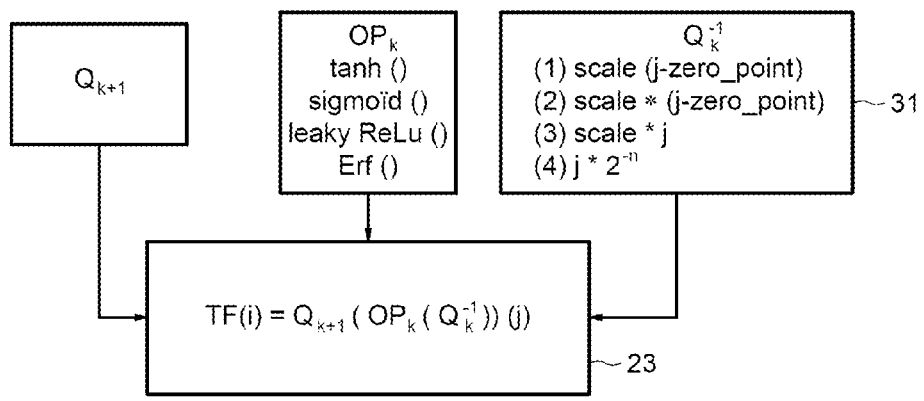

Reference will now more particularly be made to FIGS. 2 and 3 in order to describe in greater detail examples of generation of a lookup table TF.

It is assumed, for the sake of simplicity, that there is only a single operator OPk applied between the two successive layers LYk and LYk+1.

Generally, the generation of the transfer function between these two layers comprises, for each possible quantized value of the output data DSk, entails applying the inverse first quantization function $Q_{k-1}$ allowing the value quantized using a given quantization scheme to be converted into a floating-point value, applying the operator OPk to the floating-point value so as to obtain an intermediate floating-point value, and applying a second quantization function $Q_{k+1}$ to the intermediate value so as to deliver the corresponding quantized value (quantized using the same quantization scheme or another) of the input data DEk+1.

The lookup table TFi is generated (step 23) and contains, for all the possible values of the quantized output data, all the possible values of the quantized input data.

Moreover, these pre-computed values take into account the quantization scheme of the output data of the layer LYk and the quantization scheme of the input data of the layer LYk+1.

As illustrated in FIG. 2, to generate this lookup table, an index j that represents the quantized values of the output data DSk is firstly defined.

These quantized values are quantized to nb bits, and for example to 8 bits.

As illustrated in box 21 of FIG. 2, for an unsigned quantization (a), j varies between 0 and $2^{nb}-1$.

For a signed quantization (b), j varies between $-2^{nb-1}$ and $2^{nb-1}-1$.

For a signed quantization with a symmetric range (c), j varies between $-2^{nb-1}+1$ et $2^{nb-1}-1$.

For example, when a quantization to 8 bits (nb=8) is employed, j may take, in case (a), all the values comprised between 0 and 255 in decimal notation.

The index i of the lookup table TF is then defined (box 22 in FIG. 2).

In case (a), i is equal to j.
In case (b), i is equal to $j+2^{nb-1}$.
In case (c), i is equal to $j+2^{nb-1}-1$.

Generally, i is equal to j−minR where minR designates the minimum of the range of quantized values of j.

Furthermore, i varies between 0 and $2^{nb}-1$.

Thus, for a quantization to 8 bits, 256 values are obtained for the lookup table TF. The various values TF(i) of this lookup table correspond to the quantized values of the input data DEk+1 of the layer LYk+1 corresponding to the j values of the quantized output data DSk of the layer LYk, respectively.

Thus, during the implementation of the neural network, for a given quantized value of an output datum of the layer LYk, and therefore for a given value of j, the corresponding quantized value of the input datum DEk+1 will be obtained directly from the table, at the corresponding index i, this input datum being quantized using the right quantization scheme and resulting from the application of the operator OPk to the corresponding output datum of the preceding layer.

Furthermore, when, for a given layer, there is a group of output data, a group of input data is obtained for the following layer by extracting, for each output datum of the group, the corresponding value of the input datum from the lookup table TF.

FIG. 3 illustrates various possible quantization schemes and various possible operators, these operators advantageously being point-to-point operators, i.e. operators that do not modify the dimension of the tensor to which these operators are applied.

As regards the operators OPk, mention may for example be made of the hyperbolic-tangent function, the sigmoid function, the leaky-ReLu function and the Erf function. All these operators are well known to those skilled in the art and are for example described in the aforementioned ONNX document, which may be accessed by following the Internet link https://github.com/onnx/onnx/blob/master/docs/Operators.md.

As regards the inverse quantization operation Q-A, i.e. the operation that converts a quantized value into a floating-point value, it is for example possible to use, as illustrated in box 31 of FIG. 3, a uniform affine quantization (i) in which the "scale" parameter defines the quantization step size and the "zero_point" parameter is an offset between the real zero and the zero of the quantized values.

An asymmetric quantization (2) or a symmetric quantization (3) or a fixed Qmn type quantization (4) may also possibly be used.

All these examples are non-limiting and are well known to those skilled in the art, who may refer, for all intents and purposes, for more detail, to the aforementioned articles by Krishnamoorthi and Jacob.

The function $Q_{k+1}$ may be the inverse quantization scheme of one of the quantization schemes (1) to (4) mentioned in box 31 of FIG. 3.

Of course, the invention is not limited to the modes of implementation and embodiments that have just been described and encompasses all the variants thereof.

Thus, it is possible for a plurality of operators to be applied between two successive layers of the neural network.

In this case, the lookup table of the transfer function will apply these various transfer operators via successive applications in cascade of these operators to the index j.

Moreover, the present invention may for example advantageously be used in combination with the invention described in the French patent application filed under the number 1902855.

What is claimed is:

1. A method of implementing a neural network by a processing unit, the neural network comprising a succession of layers and at least one operator applied between at least one pair of successive layers, the method comprising:
generating, with a computational tool, an executable code to be executed by the processing unit to implement the neural network;
receiving, by the at least one transfer function, quantized output data from a first layer of the pair; and
generating, with the computational tool, at least one transfer function between the at least one pair of layers taking the form of a set of pre-computed values, wherein the generating the at least one transfer function comprises:
applying an inverse first quantization function for each possible quantized value to convert the quantized value into a floating point value,
applying the at least one operator to the floating point value to obtain an intermediate floating point value,
applying a second quantization function to the intermediate floating point value to deliver a corresponding quantized input data to a second layer of the pair, and
generating a lookup table comprising all of the corresponding possible values of quantized input data for all possible values of the quantized output data.

2. The method according to claim 1, further comprising executing the executable code to implement the neural network.

3. The method according to claim 1, wherein the at least one operator is a point-to-point operator.

4. The method according to claim 1, wherein the neural network comprises at least one operator applied between P pairs of successive layers, and wherein generating the at least one transfer function comprises generating P transfer functions between the P pairs of layers by generating at most P sets of values.

5. The method according to claim 1, further comprising performing a training phase for the neural network, wherein the at least one transfer function is generated during or after the training phase.

6. The method according to claim 1, wherein the computational tool comprises a microprocessor or a microcontroller.

7. A computational tool comprising:
a processor; and
a non-transitory computer readable medium storing software to be executed by the processor to implement the method according to claim 1.

8. The method according to claim 1, wherein the computational tool comprises a hardware accelerator.

9. A method for implementing a neural network using a processing unit, the neural network comprising a succession of layers and at least one operator applied between at least one pair of successive layers, the method comprising:
storing an executable code and a set of values representative of at least one transfer function between the at least one pair of layers in a memory;
executing the executable code with the processing unit, the executing comprising determining the transfer function by extracting, from the set of stored values, values corresponding to values of quantized output data of a first layer of the at least one pair of layers, the extracted values being quantized input data of a second layer of the pair;
applying an inverse first quantization function for each possible quantized value of output data to convert the quantized value into a floating point value;
applying the at least one operator to the floating point value to obtain an intermediate floating point value;
applying a second quantization function to the intermediate floating point value to deliver a corresponding quantized input data to a second layer of the pair; and
generating a lookup table comprising all of the corresponding possible values of the quantized input data for all possible values of the quantized output data.

10. The method according to claim 9, wherein the set of values is stored in the form of a lookup table representative of the at least one transfer function between the at least one pair of layers, wherein the function is intended, during the implementation of the neural network, to receive quantized output data from the first layer of the pair, to apply the at least one operator and to deliver the at least one lookup table to the second layer of the pair, quantized input data, the lookup table containing, for all possible values of the quantized output data, all corresponding possible values of the quantized input data.

11. The method according to claim 9, wherein the at least one operator is a point-to-point operator.

12. The method according to claim 9, wherein the neural network comprises at least one operator applied between P pairs of successive layers, at most P sets of values representative of the P transfer functions between the P pairs of layers being stored in the memory.

13. A device comprising:
a processor; and
a non-transitory computer readable medium storing software to be executed by the processor to implement the method according to claim 9.

14. A computational tool comprising:
a processor; and
a non-transitory computer readable medium storing software to be executed by the processor prior to an implementation of a neural network that comprises a succession of layers and at least one operator applied between at least one pair of successive layers, the software, when executed by the processor, causing the processor to:
generate an executable code intended to be executed by a processing unit to implement the neural network,
generate at least one transfer function between the at least one pair of layers taking the form of a set of pre-computed values,
apply an inverse first quantization function for each possible quantized value of output data to convert the quantized value to a floating point value,
apply the at least one operator to the floating point value to obtain an intermediate floating point value, apply a second quantization function to the intermediate floating point value to deliver a corresponding quantized input data to a second layer of the pair, and generate a lookup table comprising all of the corresponding possible values of quantized input data for all possible values of quantized output data.

15. The computational tool according to claim 14, wherein the at least one operator is a point-to-point operator.

16. The computational tool according to claim 14, wherein the neural network comprises at least one operator applied between P pairs of successive layers, and wherein the software, when executed by the processor, causes the processor to generate at most P sets of values when generating P respective transfer functions between the P pairs of layers.

17. The computational tool according to claim 14, wherein the software, when executed by the processor, causes the processor to carry out a training phase of the neural network, wherein the at least one transfer function is generated during or after the training phase.

18. The computational tool of claim 14, wherein the processor comprises a microprocessor, a hardware accelerator, a combination thereof.

19. A device comprising:
a processing unit configured to implement a digital neural network, the neural network comprising a succession of layers and at least one operator applied between at least one pair of successive layers; and
a memory configured to store an executable code allowing the neural network to be implemented and at least one set of values representative of at least one transfer function between the at least one pair of layers;
wherein the processing unit is configured to:
execute the executable code to determine the at least one transfer function by extracting values from the at least one set of stored values, the extracted values corresponding to values of quantized output data of a first layer of the at least one pair of layers, the extracted values being quantized input data of a second layer of the pair,
apply an inverse first quantization function for each possible quantized value of output data to convert the quantized value to a floating point value,
apply the at least one operator to the floating point value to obtain an intermediate floating point value,
apply a second quantization function to the intermediate floating point value to deliver a corresponding quantized input data to a second layer of the pair, and
generate a lookup table comprising all of the corresponding possible values of the quantized input data for all possible values of the quantized output data.

20. The device according to claim 19, wherein the at least one set of stored values is stored as at least one lookup table representative of the at least one transfer function between the at least one pair of layers, wherein the transfer function, during the implementation of the neural network, receives quantized output data from the first layer of the pair, applies the at least one operator and delivers quantized input data to the second layer of the pair, the at least one lookup table containing, for all possible values of the quantized output data, all corresponding possible values of the quantized input data.

21. The device according to claim 19, wherein the at least one operator is a point-to-point operator.

22. The device according to claim 19, wherein the neural network comprises at least one operator applied between P pairs of successive layers, and wherein the memory is configured to store at most P sets of values representative of the P transfer functions between the P pairs of layers.

23. The device according to claim 19, wherein the processing unit comprises a microprocessor.

24. The device according to claim 19, wherein the processing unit comprises a hardware accelerator.

* * * * *